US008092909B2

(12) United States Patent
Yong et al.

(10) Patent No.: US 8,092,909 B2
(45) Date of Patent: *Jan. 10, 2012

(54) COLOR FOUNDATION COAT AND COLOR TOP COAT PAINT SYSTEM

(75) Inventors: Yang Yong, Hillsborough, NJ (US); Mohammad Asif, Middletown, NJ (US); Robert Sheerin, North Caldwell, NJ (US); Brent Smerak, Wharton, NJ (US)

(73) Assignee: Columbia Insurance Company, Omaha, NE (US)

( * ) Notice: Subject to any disclaimer, the term of this patent is extended or adjusted under 35 U.S.C. 154(b) by 852 days.

This patent is subject to a terminal disclaimer.

(21) Appl. No.: 11/470,817

(22) Filed: Sep. 7, 2006

(65) Prior Publication Data

US 2008/0060552 A1 Mar. 13, 2008

(51) Int. Cl.
*B32B 27/20* (2006.01)

(52) U.S. Cl. .................................... 428/411.1; 428/212

(58) Field of Classification Search ........................ None
See application file for complete search history.

(56) References Cited

U.S. PATENT DOCUMENTS

| | | | |
|---|---|---|---|
| 2,286,964 | A | 10/1940 | Hucks |
| 3,839,253 | A | 10/1974 | Kershaw |
| 3,894,976 | A | 7/1975 | Kang et al. |
| 3,973,981 | A | 8/1976 | Miyatake |
| 3,983,643 | A | 10/1976 | Schreyer |
| 4,004,054 | A | 1/1977 | Audykowski |
| 4,025,475 | A | 5/1977 | Enomoto |
| 4,137,208 | A | 1/1979 | Elliott |
| 4,156,616 | A | 5/1979 | Dietz |
| 4,243,417 | A | 1/1981 | Grourke |
| 4,416,940 | A | 11/1983 | Loye |
| 4,491,481 | A | 1/1985 | Robertson |
| 4,539,258 | A | 9/1985 | Panush |
| 4,552,780 | A | 11/1985 | Abe |
| 4,585,693 | A | 4/1986 | DeBergalis |
| 4,598,015 | A | 7/1986 | Panush |
| 4,615,940 | A | 10/1986 | Panush |
| 4,824,728 | A | 4/1989 | Parsons et al. |
| 4,963,600 | A | 10/1990 | Coughlin |
| 5,025,041 | A | 6/1991 | Pfenniger |
| 5,082,498 | A | 1/1992 | Kurtz |
| 5,213,618 | A | 5/1993 | Souma |
| 5,264,032 | A | 11/1993 | Dietz |
| 5,271,759 | A | 12/1993 | Wooden |
| 5,276,075 | A | 1/1994 | Santini |
| 5,304,245 | A | 4/1994 | Mochizuki |
| 5,348,580 | A | 9/1994 | Chassot |
| 5,436,349 | A | 7/1995 | Winter |
| 5,447,561 | A | 9/1995 | Chiba |
| 5,502,101 | A | 3/1996 | Schwarte |
| 5,506,282 | A | 4/1996 | Min |
| 5,516,914 | A | 5/1996 | Winter |
| 5,522,925 | A | 6/1996 | Chassot |
| 5,633,037 | A | 5/1997 | Mayer |
| 5,637,706 | A | 6/1997 | Stevenson |
| 5,641,350 | A | 6/1997 | Chassot |
| 5,647,535 | A | 7/1997 | Nakazono et al. |
| 5,725,908 | A | 3/1998 | Ogasawara |
| 5,807,924 | A | 9/1998 | Becker |
| 5,830,567 | A | 11/1998 | Panush |
| 5,843,220 | A | 12/1998 | Babler |
| 5,855,662 | A | 1/1999 | Brand |
| 5,866,199 | A | 2/1999 | Swidler |
| 5,871,827 | A | 2/1999 | Jaffe |
| 5,958,129 | A | 9/1999 | Urban |
| 5,985,987 | A | 11/1999 | Adolfsson |
| 5,997,627 | A | 12/1999 | Babler |
| 6,040,062 | A | 3/2000 | McGee |
| 6,194,513 | B1 | 2/2001 | Sagiv |
| 6,348,544 | B1 | 2/2002 | Sagiv |
| 6,521,038 | B2 | 2/2003 | Yanagimoto |
| 6,589,603 | B1 | 7/2003 | Cornell et al. |
| 6,596,071 | B2 | 7/2003 | Hayashi |
| 6,663,951 | B2 | 12/2003 | Johnson |
| 7,014,466 | B2 | 3/2006 | Cojic et al. |
| 2003/0125416 | A1 | 7/2003 | Munro et al. |
| 2004/0220322 | A1 | 11/2004 | Gooding et al. |
| 2005/0019575 | A1 | 1/2005 | Jungnitz |
| 2005/0019600 | A1 | 1/2005 | Choi et al. |
| 2005/0056189 | A1 | 3/2005 | Decker |
| 2005/0129964 | A1 | 6/2005 | Hugo |
| 2006/0008588 | A1 | 1/2006 | Chilla |
| 2006/0051513 | A1 | 3/2006 | Jackson |

FOREIGN PATENT DOCUMENTS

WO WO 2006058301 A2 * 6/2006

OTHER PUBLICATIONS

Sharma, et al. "The CIEDE2000 Color-Difference Formula: Implementation Notes, Supplementary Test Data, and Mathematical Observations," submitted to Color Research and Application, Feb. 9, 2004. "PaintScratch Clearcoat: Automotive Touch-Up Paint," www.paintscratch.com/clear.htm, (Jun. 2006).

"Automotive Clearcoat for Use over Basecoat Color," www.automotivetouchup.com/auto_paint_clearcoat.aspx, (Jun. 2006).

International Search Report and Written Opinion issued in connection with related application PCT/US07/77331 on Feb. 22, 2008.

Extended European Search Report issued in connection with the corresponding European Patent Application No. 07841690.6 on Jul. 13, 2011.

* cited by examiner

*Primary Examiner* — Ramsey Zacharia
(74) *Attorney, Agent, or Firm* — The H.T. Than Law Group

(57) ABSTRACT

A paint system is provided that includes a foundation base component combined with a tinted, opaque top coat component and that hides any colors on all types of substrates and maintains the brightness and cleanness for all colors. The foundation base component is a tintable color base containing at least one organic synthetic pigment at an amount of at least twice as much as the amount of organic synthetic pigment in the top coat component. The tintable foundation base component has a volume ratio of organic pigments to inorganic pigments of at least about 0.5 and a volume ratio of organic pigment to polymer binder of at least about 0.1. The volume ratio of organic pigment to polymer binder in the top coat component is less than about 10.1 with at least about 80% by volume of pigments being synthetic organic pigments.

33 Claims, 4 Drawing Sheets

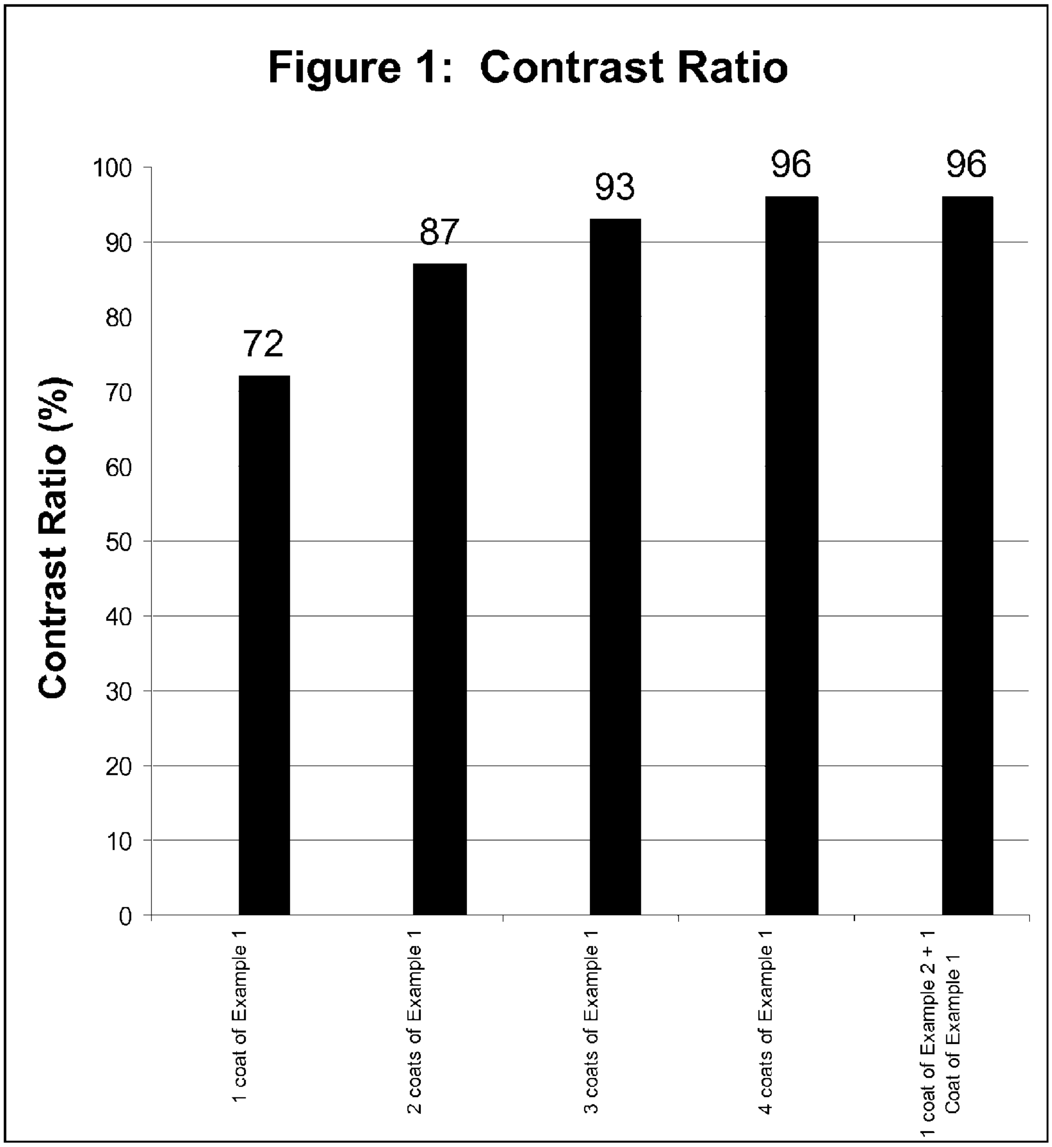
Figure 1: Contrast Ratio
Contrast Ratio (%)
100
90
80
70
60
50
40
30
20
10
0
72
87
93
96
96
1 coat of Example 1
2 coats of Example 1
3 coats of Example 1
4 coats of Example 1
1 coat of Example 2 + 1 Coat of Example 1

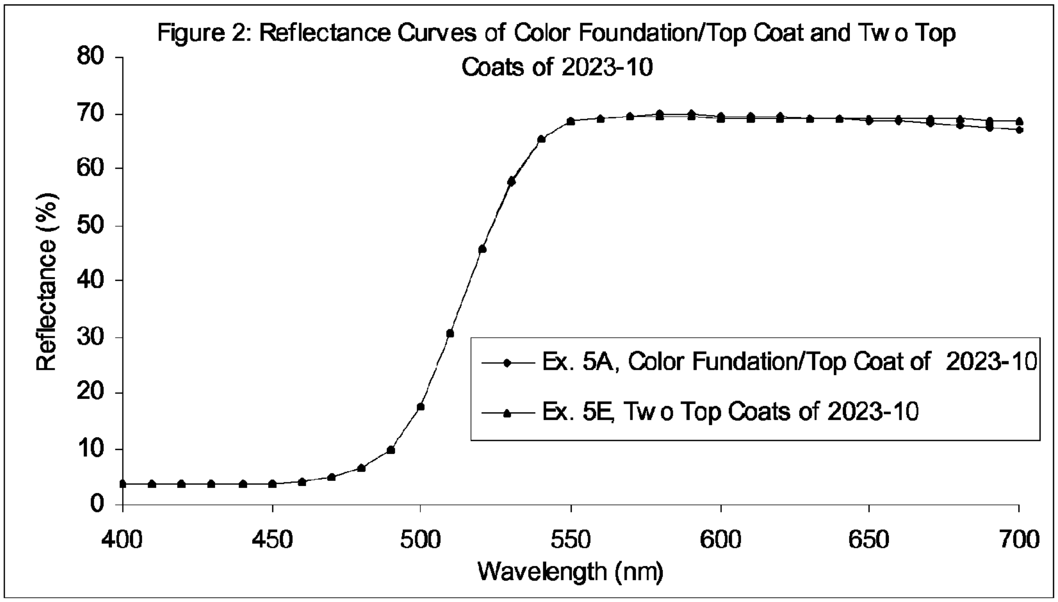
Figure 2: Reflectance Curves of Color Foundation/Top Coat and Tw o Top Coats of 2023-10
Reflectance (%)
80
70
60
50
40
30
20
10
0
400
450
500
550
600
650
700
Wavelength (nm)
Ex. 5A, Color Fundation/Top Coat of 2023-10
Ex. 5E, Tw o Top Coats of 2023-10
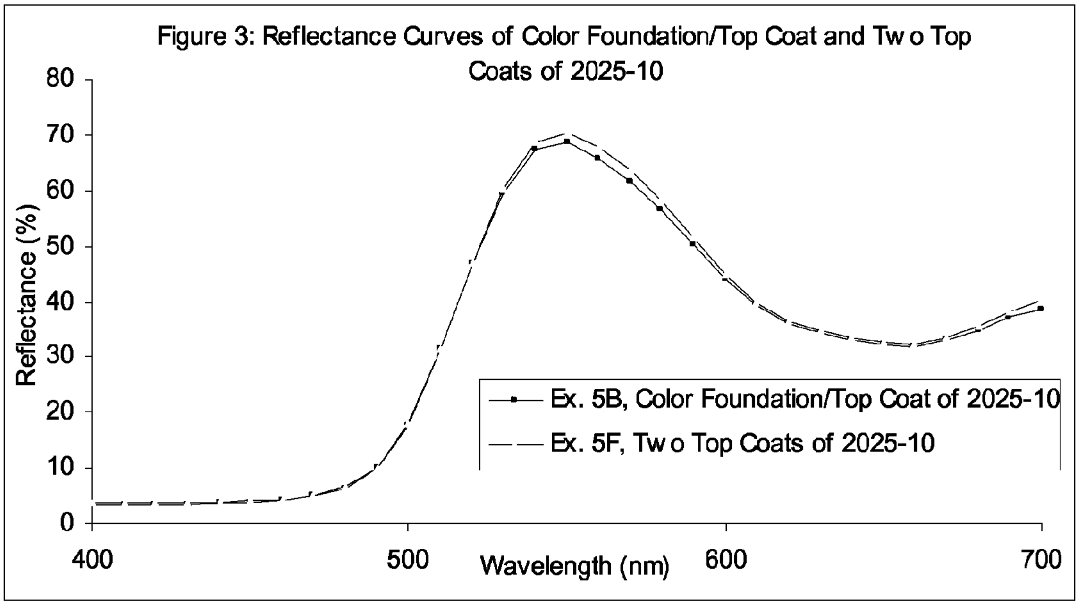
Figure 3: Reflectance Curves of Color Foundation/Top Coat and Tw o Top Coats of 2025-10
Reflectance (%)
80
70
60
50
40
30
20
10
0
400
500
600
700
Wavelength (nm)
Ex. 5B, Color Foundation/Top Coat of 2025-10
Ex. 5F, Tw o Top Coats of 2025-10

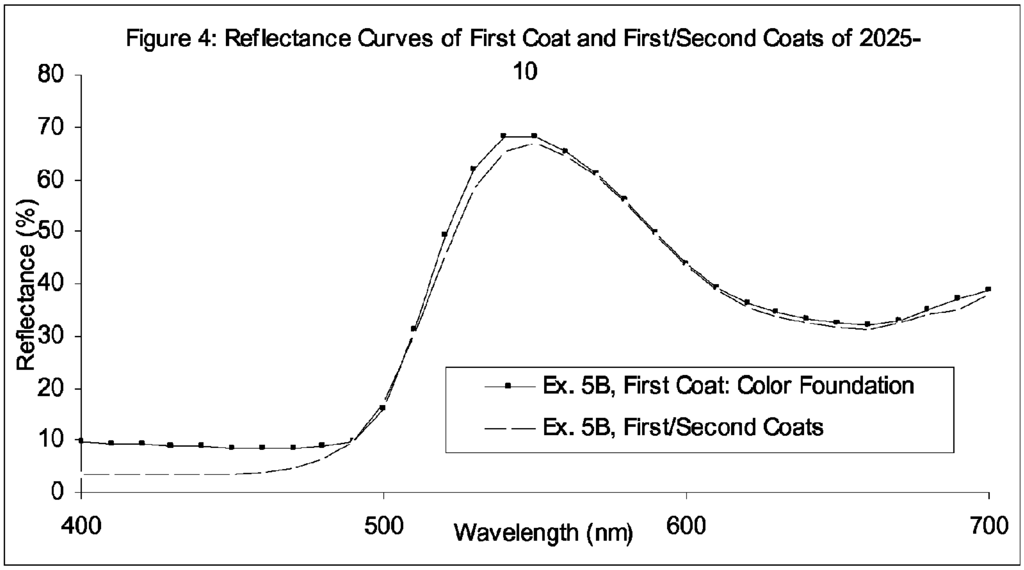
Figure 4: Reflectance Curves of First Coat and First/Second Coats of 2025-10
Reflectance (%)
0
10
20
30
40
50
60
70
80
400
500
600
700
Wavelength (nm)
Ex. 5B, First Coat: Color Foundation
Ex. 5B, First/Second Coats
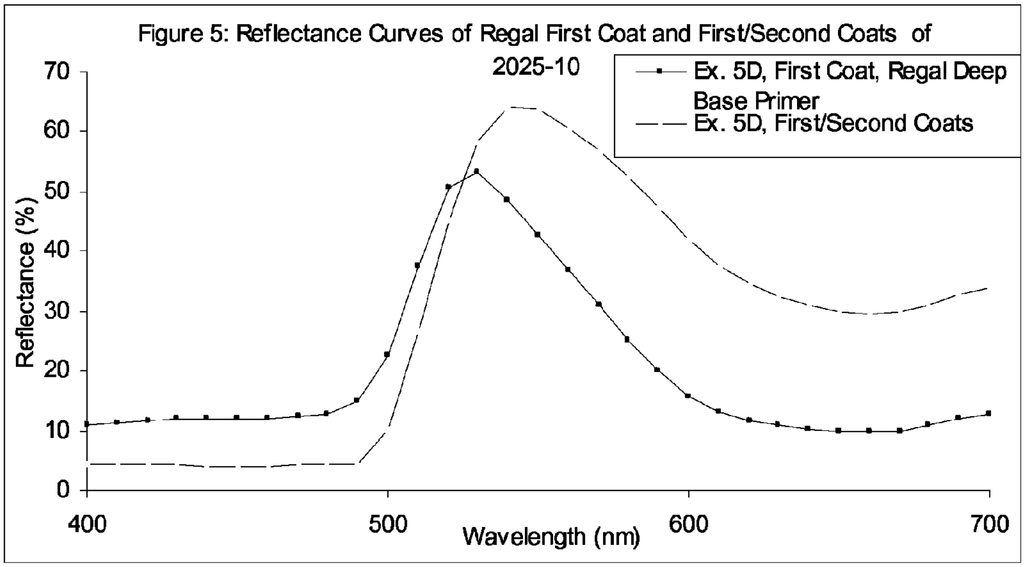
Figure 5: Reflectance Curves of Regal First Coat and First/Second Coats of 2025-10
Ex. 5D, First Coat, Regal Deep Base Primer
Ex. 5D, First/Second Coats
Reflectance (%)
0
10
20
30
40
50
60
70
400
500
600
700
Wavelength (nm)

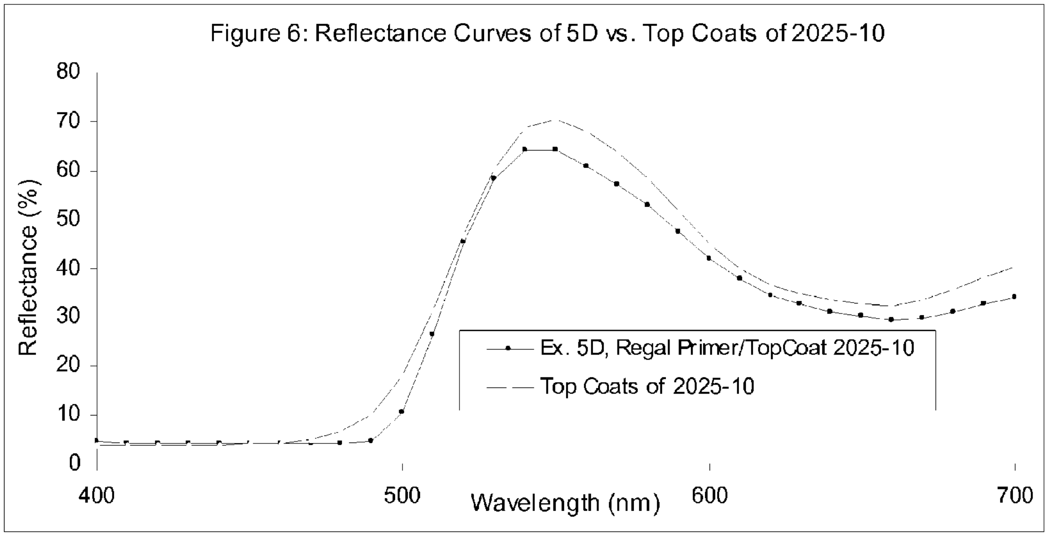
Figure 6: Reflectance Curves of 5D vs. Top Coats of 2025-10
Reflectance (%)
80
70
60
50
40
30
20
10
0
400
500
600
700
Wavelength (nm)
Ex. 5D, Regal Primer/TopCoat 2025-10
Top Coats of 2025-10
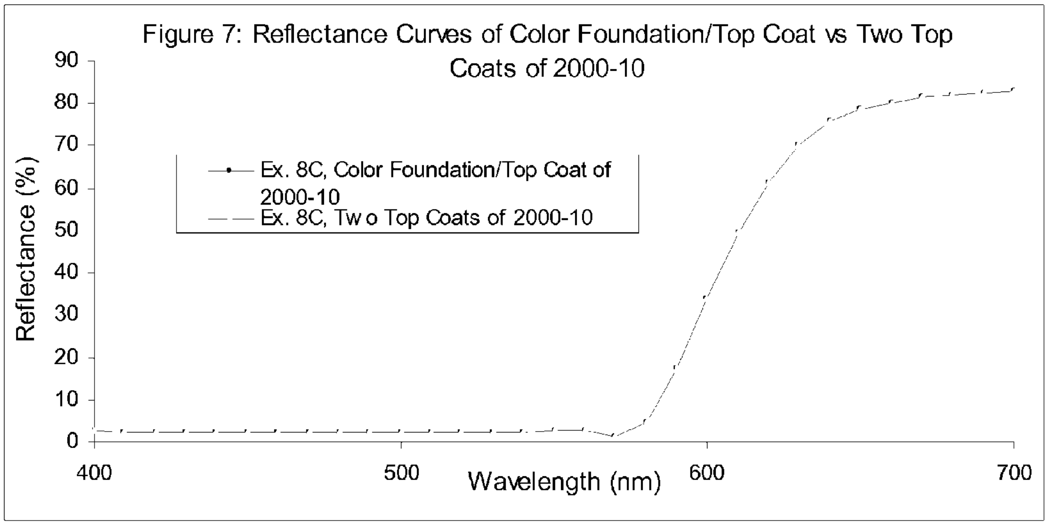
Figure 7: Reflectance Curves of Color Foundation/Top Coat vs Two Top Coats of 2000-10
Reflectance (%)
90
80
70
60
50
40
30
20
10
0
400
500
600
700
Wavelength (nm)
Ex. 8C, Color Foundation/Top Coat of 2000-10
Ex. 8C, Two Top Coats of 2000-10

COLOR FOUNDATION COAT AND COLOR TOP COAT PAINT SYSTEM

FIELD OF THE INVENTION

The present invention relates to multi-component paint systems.

BACKGROUND OF THE INVENTION

Organic color pigments provide brilliant, i.e., bright and clean, chroma for yellow, red, orange and green that inorganic color pigments do not provide. In color science, three parameters, brightness (L*), chroma (C*) and hue (H*), are used to represent the qualities of a given color. The C*, which is a measurable parameter, is expressed as the distance of a color in the color space to the central point. The further away a color is from the central point, the larger the C* is and the cleaner or clearer the color is. In a deep base or clear base with little or no inorganic color pigments, organic pigments are the primary choices for achieving bright, clear and highly saturated colors. Blending inorganic white or other color pigments with an organic pigment results in a loss of the brilliant chroma of the organic pigment.

In conventional tint-based paint systems, a single paint product that has been tinted to the desired color is applied to a substrate, e.g., a wall. The paint product having the desired color is obtained by adding from 1 to 15% by volume of color concentrates made with primary color pigments to a tint base. The color concentrates made from organic color pigments typically contain organic color pigment from 1 to 30% by volume. Therefore, a clear base paint with maximum loading of organic pigment load at 15% will contain organic pigment no more than 5% by volume. At these pigment concentrations, however, paint products containing organic yellow, orange, red and green colors lack the opacity necessary to produce the desired color on the substrate and to provide the desired level of hiding of existing substrate colors, markings or patterns. In order to overcome these limitations and to achieve the desired colors and necessary hiding qualities, these paint products are conventionally applied in multiple overlapping coats, for example from at least three to eight or more coats of paint. For example, four to eight coats are required for colors such as yellow, light green, organic red or orange to achieve the desired level of hiding when applied on a white wall containing dark stripes.

Alternate attempts at achieving improved hiding characteristics use a mixture of inorganic pigments and organic pigments in the paint. Although mixtures of organic and inorganic pigment provide the desired color (hue), the brilliant chroma (L* and C*) associated with the organic pigment is decreased. In addition, existing paint systems utilize separate primer coats, e.g., a white primer, to achieve additional hiding of existing substrate colors and pattern, in particular when using the paints that contain poor hiding color pigments. White primer coat paint systems, however, typically require the application of at least one and possibly more primer coats in addition to two or more coats of the tinted paint on top of the white primer to overcome or to hide the white color of the primer coat. In an attempt to improve the hiding capabilities of paint systems that utilize a primer coat in combination with the tinted paint, a small amount of non-white color pigment has been added to the relatively large amount of white pigment in the primer. Although the use of tintable primers results in some improved hiding, the number of coats of the tinted paint that are required to be added over the primer coat is still at least two, and the total number of applied coats is still at least three. Therefore, known methods for utilizing organic pigment colors including yellow, orange and red use (1) three or more tinted coats, or (2) one or multiple coats of white primer or tintable primer in combination with one (if multiple primer coats are used) or multiple coats of tinted top coats. All of these known methods require at least three and possibly more coats to provide a sufficient amount of hiding and to achieve the desired color in the finished painted surface.

Two coat paint systems are found in metal coating or automobile painting applications. Examples of these systems are described in, for example, U.S. Pat. Nos. 5,871,827, 5,025,041 and 5,830,567. These systems, however, utilize a heavily tinted base in combination with a clear top coat that is transparent or substantially transparent. The clear top coat is applied for purposes of protecting the base coat and imparting a glossy finish. In addition, the clear top coat may include additives such as metallic flakes or minute amounts of pigment that are added to provide the desired effects to the basecoat, for example a pearlescent appearance. The additives do not significantly diminish the transparency of the clear coat, and the clear coat does not contribute to the hiding properties of the base coat.

Therefore a paint product or paint system is needed that provides sufficient hiding of a substrate with only two layers or coats.

SUMMARY OF THE INVENTION

Exemplary inventive embodiments of paint systems and methods for using these paint systems to cover a substrate utilize just two coats or layers, i.e., a foundation base and a top coat to provide the desired amount of hiding of existing walls colors, i.e., opacity, in combination with the desired brightness and chroma (as measured by L* and C*) of organic color pigments for any colors, using any types of color pigments, and on any type of substrate. Paint systems in accordance with the present invention utilize a tintable foundation base component in combination with a top tint-base or top coat component to obtain brilliant colors of any shade of yellow, green, orange and red and to achieve the full opacity of coatings. Minimizing the number of coats to cover a substrate, regardless of the pre-existing color or patterns can result in significant cost savings to the consumers, since a large portion of the costs of painting is associated with labor.

The tintable foundation base component can be either a tintable translucent or white (no organic color pigment) base tinted with color concentrates, or a tintable color base with organic pigments grinded in, for example a red foundation base or a yellow foundation base. The foundation base uses an unconventionally large amount of organic color pigments, for example at least about 8% by volume of organic color pigments when dried, preferably at least about 15% and more preferably at least about 20%, depending on the colors. With a relatively large amount of organic color pigments, the foundation base component can be shaded to obtain any color (hue) that matches or is close to the color of the top coat. In addition, the amount of organic color pigments in the foundation base component is at least about twice, preferably at least about 2.5 times, and more preferably at least about 3 times, as much as the amount of organic color pigments in the top coat component.

Inorganic color pigments may also be included in the foundation base component to enhance the masking or hiding properties of the foundation base component and the final paint system. The volume ratio of organic color pigment to inorganic color pigment in the foundation base component is selected to be at least about 0.5, preferably at least about 1.0 and more preferably at least about 2.0. This ratio can be as high as desired, since the inclusion of inorganic color pigment is optional. Since using a mixture of organic and inorganic pigments will improve the hiding at the cost of losing the chroma of organic pigment components, no inorganic color pigment is used in some embodiments. In one embodiment, the foundation base component includes color concentrates to obtain color matching to the top coat.

The top coat component also contains primarily organic color pigments. In one embodiment, at least 80% by volume, preferably at least 85%, more preferably at least 90% of all color pigments in the top coat component are organic color pigments, therefore retaining the characteristics of brightness and chroma of organic pigments. While the foundation base component is formulated to provide the desired opacity and hue in the final product, the top coat is formulated to enhance the brightness and cleanness of the coatings. The combination of the two coats is sufficient to offer the brightness, cleanness and full opacity for any shade of color including orange, yellow, reds and green on any type of substrate. Paint systems formulated in accordance with the present invention require only two coats to obtain the desired hiding for any shades of yellow, red, orange, and green without sacrificing brightness and cleanness.

BRIEF DESCRIPTION OF THE DRAWINGS

In the accompanying drawings, which form a part of the specification and are to be read in conjunction therewith:

FIG. 1 is a graph plotting the contrast ratios of a conventional color finish with multiple coats as well as a color foundation coat and color top coat paint system, according to the present invention.

FIG. 2 is a graph plotting the overall reflectance for a color foundation coat and color top coat paint system, according to the present invention, as well as two same-colored top coats of Benjamin Moore Color Palette 2023-10.

FIG. 3 is a graph plotting the overall reflectance for a color foundation coat and color top coat paint system, according to the present invention, as well as two same-colored top coats of Benjamin Moore Color Palette 2025-10.

FIG. 4 is a graph plotting the overall reflectance for the first coat as well as the second coat of a color foundation/top coat system according to the present invention.

FIG. 5 is a graph plotting the overall reflectance for the first coat and second coat of a conventional primer/top coat system.

FIG. 6 is a graph plotting the overall reflectance for a conventional primer coat and a top coat as well as two top coats.

FIG. 7 is a graph plotting the overall reflectance for a color foundation coat and color top coat paint system, according to the present invention, as well as two same-colored top coats.

DETAILED DESCRIPTION

Paint systems in accordance with exemplary embodiments of the present invention include a foundation base component and a top coat component. The foundation base component is a tintable color base or a clear base that is shaded or colored with color concentrates to match or substantially match the color of the top coat component. The foundation base component is preferably not a white foundation base or white primer that can affect or change the color of the top coat unless the color of the top coat is white. Instead, the foundation base component is tinted to match the top coat component to provide both the desired amount of hiding of colors or markings on the substrate to which the paint system is applied, and to enhance the brightness and hue of the color of the paint system.

The foundation base and the top coat are paints that are capable of forming films and generally contain a binder, a diluent, one or more color pigments and other additives including fillers. The binder eventually solidifies to form the dried paint. Depending on the type of binder, this solidification or hardening may be a result of a chemical reaction or curing (polymerization), evaporation, i.e., drying, or even cooling. In one embodiment, the binder dries to form a solid film when the diluent or solvent evaporates. In another embodiment, the binder is a polymer binder that solidifies during curing or polymerization. Typical binders include synthetic or natural resins such as acrylics, polyurethanes, polyesters, melamines, oils, or latex. Examples of suitable polymers include, but are not limited to, high molecular weight organic materials including polyacrylics, polymethacrylics, polyesters, polyurethanes and copolymers thereof. Alternatively, cured binder films are formed from crosslinkers, such as polyurethane or melamine resins, reacted with acrylic polyester or polyurethane resins, often in the presence of a catalyst which serves to make the curing reaction proceed more quickly or under milder conditions. These cured-film paints can be either solvent-borne or waterborne. Preferably, the binder used in the foundation base component is a polymeric binder.

In addition, other suitable waterborne paints are emulsions of solid binders in water. Upon evaporation of the diluent, the molecules of the binder coalesce to form a solid film. Such emulsion paints are also known as latex paints because the polymer is formed through an emulsion polymerization through which the monomers are emulsified in a water-continuous phase. Since the polymer is not soluble in water, the dried paint is water resistant. Other types of binders form films as a result of cooling. For example, encaustic or wax paints are liquid when warm, and harden upon cooling.

Suitable diluents are known and available in the art and are selected based upon the type of binder that is being used. Examples of diluents include, but are not limited to, organic solvents such as alcohols, ketones, esters, glycol ethers and combinations thereof. Other diluents include water and volatile low-molecular weight synthetic resins.

Other additives can be included in the foundation base component depending upon the application to which the paint is used or based upon desired qualities in the paint systems. These additives include, but are not limited to, catalysts, thickeners, stabilizers, emulsifiers, texturizers, adhesion promoters, flatteners (de-glossing agents), UV absorbers and hindered amine light stabilizers, dispersants, wetting agents, anti-settling agents and combinations thereof. The additives also include one or more fillers. In general, fillers serve to thicken the film, support its structure and simply increase the volume of the paint. Common fillers are inexpensive and inert, for example talc, lime, baryte and bentonite clay.

The foundation base component also includes at least one color pigment. Alternatively, the foundation base component contains a plurality of color pigments, both organic color pigments and inorganic color pigments. The color pigments are selected based upon the desired color in final dried paint. The color pigments are added to the foundation base material in an amount sufficient to provide the desired hiding or covering of the substrate to which the paint system is applied. More specifically, the amount of color pigments are sufficient to hide dark or multi-colored backgrounds, i.e., gray stripes on a white background, with the application of only the foundation base component and the top coat component. The color pigments are added to the foundation base component in an amount such that the volume ratio of organic color pigments to binder (Volume of Color Pigments/Volume of Binder) is at least about 0.10, preferably at least 0.15, and more preferably at least 0.20.

As stated above, the color pigments can be organic color pigments, inorganic color pigments or mixtures thereof. In one embodiment, the foundation base component includes at least one organic color pigment, and can contain a plurality of different organic color pigments, for example synthetic organic color pigments. Alternatively, the foundation base component includes a mixture of organic color pigments and inorganic color pigments. In this mixture, the majority of color pigments are organic color pigments. In one embodiment, the volume ratio of organic color pigments to inorganic color pigments in the foundation base component is at least about 0.5, preferably at least about 1.0, more preferably at least about 1.5, and can increase as high as desired. In fact, this ratio can be infinitely high for foundation base components that do not contain any inorganic color pigments. In general, a sufficient amount of organic color pigments are included in the foundation base component so that the organic color pigments represent at least about 8%, preferably at least about 15%, more preferably at least about 30% by volume of the dried film.

The inventive paint system also includes a top coat component that is applied over the foundation base component after it dries. The top coat component can include the same constituents, i.e., binders, diluents, color pigments and additives, as the foundation base component. The top coat component includes the same general formulation of binders, diluents and additives as the foundation base component or can include a different formulation. The top coat component can include both organic color pigments and inorganic color pigments. Suitable organic and inorganic color pigments are the same as for the foundation base component. Although the top coat component can contain both organic and inorganic color pigments, preferably, the top coat component contains primarily organic color pigments. In one embodiment, at least about 80%, preferably 85%, more preferably 90% by volume of all color pigments in the top coat component are organic color pigments. In addition, the ratio of organic color pigments in the foundation base component to the organic color pigments in the top coat component is at least about 2 times, preferably at least about 2.5 times, and more preferably more than 3 times. In order to facilitate adequate hiding of the substrate while achieving the desired color in the final paint system without substantial loss in color qualities such as brightness, the foundation base component and the top coat component are formulated to be substantially the same color.

The top coat composition is preferably opaque. As used herein, the term “opaque”, in reference to substrates, coatings, compositions that are made into coatings and the like (hereinafter referred to generally as coating(s), without intent to limit), including, but not limited to, solid and/or liquid states, means that the coating has an average transmittance of visible light, e.g., between about 380 nm and about 770 nm or alternately between about 400 nm and about 700 nm, of less than about 30% on a 3-mil drawdown film, preferably at least about 20%, more preferably at least about 10%. The average transmittance referred to herein is typically measured for incident light normal, i.e., approximately 90°, to the plane of the coating and can be measured using any known light transmission apparatus and method, e.g., a UV-Vis spectrophotometer. Both the foundation paint and the top coat paint form opaque films on the substrate to be covered.

General descriptions of paints and components thereof can be found in commonly-owned, co-pending U.S. patent application Ser. Nos. 11/290,667, filed on Nov. 30, 2005, Ser. No. 11/384,183, filed on Mar. 16, 2006 and 11/323,622, filed on Dec. 30, 2005. These applications are incorporated by reference herein in their entireties.

Both synthetic and natural organic pigments can be used. Suitable organic color pigments include, but are not limited to, azo (monoazo, disazo, β-naphthol, naphthol AS, benzimidazolone, disazo condensation etc.), metal-complex, isoindolinone and isoindoline, phthalocyanine, quinacridone, perinone and perylene, anthraquinone, diketopyrrolopyrrole (DPP), dioxazine, quinophthalone and fluorescent pigments.

In general, the main categories of suitable organic color pigments can be classified as azo pigments and non-azo or polycyclic pigments. Suitable pigments are disclosed in U.S. Pat. No. 5,985,987, which is incorporated herein by reference in its entirety. These suitable pigments include organic pigments such as,

| Color | Chemical Name/Color Index |
|---|---|
| Yellows | Flavanthrone PY 24 |
| | Monoazo PY 74 |
| | Diarylide PY 83 |
| | Monoazo PY 97 |
| | Anthrapyrimidine PY 108 |
| | Isoindolinone PY 109 |
| | Isoindolinone PY 110 |
| | Benzimidazolone PY 120 |
| | Disazo condensation PY 128 |
| | Quinophthalone PY 138 |
| | Isoindoline PY 139 |
| | Benzimidazolone PY 151 |
| | Benzimidazolone PY 154 |
| | Bisacetoacetarylide PY 155 |
| | Isoindolinone PY 173 |
| | Benzimidazolone PY 175 |
| | Benzimidazolone PY 194 |
| Oranges | Benzimidazolone PO 36 |
| | Perinone PO 43 |
| | Pyranthrone PO 51 |
| | Benzimidazolone PO 62 |
| | Pyrazoloquinazolone PO 67 |
| | Isoindoline PO 69 |
| Reds | BONA Mn PR 48:4 |
| | BONA Mn PR 52:2 |
| | Thioindigo PR 88 |
| | Naphthol AS PR 112 |
| | Quinacridone PR 122 |
| | Perylene PR 123 |
| | Disazo condensation PR 144 |
| | Disazo condensation PR 166 |
| | Anthantrone PR 168 |
| | Naphthol AS PR 170 |
| | Anthraquinone PR 168 |
| | Perylene PR 178 |
| | Perylene PR 179 |
| | Naphthol AS PR 188 |
| | Quinacridone PR 202 |
| | Disazo condensation PR 242 |
| | Pyrazoloquinazolone PR 251 |
| | Naphthol AS PR 253 |
| | Diketo pyrrolo pyrrol PR 254 |
| | Diketo pyrrolo pyrrol PR 264 |
| Violets | Quinacridone PY 19 |
| | Dioxazine PY 23 |
| | Perylene PY 29 |
| | Dioxazine PY 37 |
| Blues | Phthalocyanine α-mod. PB 15:2 |
| | Phthalocyanine β-mod. PB 15:3 |
| | Phthalocyanine β-mod. PB 15:4 |
| | Phthalocyanine ϵ-mod. PB 15:6 |
| | Metal-free phthalocyanine PB 16 |
| | Indanthrone PB 60 |

-continued

| Color | Chemical Name/Color Index |
|---|---|
| Greens | Phthalocyanine PG 7 |
| | Phthalocyanine PG 36 |
| Browns | Disazo condensation PBr 23 |
| | Benzimidazolone PBr 25 |
| | Isoindoline PBr 38 |
| Blacks | Aniline PBk 1 |
| | Perylene PBk 31 |
| | Perylene PBk 32 |

Other pigments include organic-inorganic hybrid pigments such as TICO pigments (commercially available from Heubach). Examples of TICO pigments are

| Color | TICO Pigment |
|---|---|
| Yellows | TICO Yellow 588 |
| | TICO Yellow 591 |
| | TICO Yellow 594 |
| | TICO Yellow 597 |
| | TICO Yellow 620 |
| | TICO Yellow 622 |
| | TICO Yellow 623 |
| Oranges | TICO Orange 638 |
| | TICO Orange 640 |
| Reds | TICO Red 642 |
| | TICO Red 644 |
| | TICO Red 655 |
| | TICO Red 670 |
| Greens | TICO Green 514 |
| Yellows | TICO Yellow 588K |
| | TICO Yellow 593K |
| | TICO Yellow 599K |
| | TICO Yellow 610K |
| Oranges | TICO Orange 636K |
| Reds | TICO Red 643K |
| | TICO Red 655K |
| | TICO Red 670K |

Both synthetic and natural inorganic pigments can be used. Suitable inorganic color pigments include, but are not limited to, pigments in elementary form, i.e., carbon and aluminum, oxide and oxide hydroxide pigments, e.g., $TiO_2$, $Fe_2O_3$ and FeO(OH), oxide mixed-phase pigments, e.g., $4BiVO_43Bi_2MoO_6$, $(Co,Ni,Zb)_2TiO_4$ and $Cu(Fe,Cr)_2O_4$, sulphide and sulphate pigments, e.g., ZnS, $BaSO_4$ and ZnS+$BaSO_4$, chromate and chromate molybdate mixed-phase pigments, e.g., $PbCrO_4$+$PbSO_4$ and $PbCrO_4$+$PbSO_4$+$PbMoO_4$, complex salt pigments, for example iron blues are complex salts of ammonium and sodium ferriferrocyanides, and silicate pigments, e.g., ultramarines ($Na_7$ $Al_6$ $Si_6$ $O_{24}$ $S_3$).

Suitable inorganic pigments, as disclosed in the '987 patent, include

| Color | Chemical Name/Color Index |
|---|---|
| Yellows | Iron oxide PY 42 |
| | Nickel rutile PY 53 |
| | Bismuth vanadate PY 184 |
| Reds | Iron oxide PR 101 |
| Violets | Ultramarine PV 15 |
| Blues | Iron Blue PB 27 |
| | Cobalt PB 28 |
| | Ultrmarine PB 29 |
| | Cobalt PB 36 |
| Greens | Chromium oxide PG 17 |
| | Cobalt PG 26 |
| | Cobalt PG 50 |

-continued

| Color | Chemical Name/Color Index |
|---|---|
| Browns | Iron oxide PBr 6 |
| | Umbra PBr 7 |
| | Chrome rutile PBr 24 |
| Blacks | Lamp Black PBk 6 |
| | Carbon Black PBk 7 |
| | Iron oxide PBk 11 |
| | Spinel Black PBk 22 |
| | Iron copper PBk 23 |
| | Cobalt PBk 27 |
| | Chrome oxide PBk 30 |

In one exemplary embodiment, a paint system in accordance with the present invention consists essentially of the foundation base component that contains at least one organic color pigment representing at least about 8% of the volume when dry, and a top coat component applied over the foundation base component and containing one or more organic color pigments at an amount of at least about 80% of all color pigments by volume, and formulated such that the ratio of organic color pigments in the foundation base component to organic color pigments in the top coat component is at least about 2.

The present invention is also directed to methods for covering substrates using paint systems formulated in accordance with the present invention. Suitable substrates include, but are not limited to, metals, such as steel, iron and aluminum, and plastics, such as thermoplastics, like polycarbonates, polyacrylates and especially thermoplastic polyolefins, papers, wood and wood products, cardboard, plaster, dry-wall or plasterboard and combinations thereof. The paint system can be applied to the substrate using any suitable method known and available in the art including, brushing, rolling and spraying. In one embodiment, a single coat or layer of a foundation base component formulated in accordance with the present invention is applied to the substrate. The foundation based component can be allowed to partially or completely dry. A single coat or layer of the top coat component formulated in accordance with the present invention is then applied over the foundation base component.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

EXAMPLES

The following Examples are merely illustrative of certain embodiments of the invention. The following Examples are not meant to limit the scope and breadth of the present invention, as recited in the appended claims.

Example 1

Conventional Color Finish, Formulated Using Organic Yellow Colorant

A one gallon aluminum can was filled with Benjamin Moore Details Eggshell 5244X (115 oz.) and Benjamin Moore Details Colorant 229Y1(Organic Yellow) (15 oz.).

The formulation was mixed in a mechanical shaker for 6 minutes. Using a 3-mil drawdown bar, a drawdown was applied onto a black and white Leneta drawdown card (Form 18B). A drawdown is the application of paint evenly to a card such as Leneta drawdown cards. In this Example, Form 18B is a black and white card comprising four areas: two sealed white areas, one unsealed white area and one sealed black area Form 18B is a penopac chart, which measures opacity and penetration. Leneta cards are known in the art. In all the Examples discussed herein Form 18B is used as the substrate.

The drawdown was dried overnight and the contrast ratio (C/R) of the dried film was measured with a spectrophotometer. A second drawdown was then made on the top of the first coat to obtain the C/R of the two-coat dry film. Third and fourth drawdowns were also made, and the corresponding C/Rs of the three-coat and four-coat dry films were determined. The C/Rs of the one-coat, two-coat, three-coat, and four-coat dry films are shown in FIG. 1. Contrast ratio (C/R) is a measurement of the hiding power (or opacity) of a paint. C/R is measured in accordance with ASTM D2085-88 "Standard Test Method for Hiding Power of Paints by Reflectometry." When two coats with the same C/R are applied, a C/R of at least 95% of each coat is considered acceptable. The overall C/R of at least 99%, and more preferably 99.5%, is considered acceptable for two or more coats of dry film.

As shown in FIG. 1, four coats of the Example 1 paint are necessary to provide a C/R of 96% on the Form 18B card.

Example 2

Color Foundation Finish, Formulated Using Organic Yellow Color Pigment Conentrate (BM 229 Y1)

A color foundation finish (100 gallons) was prepared using the following quantities of grind and letdown ingredients:

| | Quantity (pounds) |
|---|---|
| Grind Ingredient | |
| Benjamin Moore (BM) Organic Yellow Color Pigment Concentrate (BM 229 Y1)* | 465 |
| Letdown Ingredient | |
| Propylene Glycol | 10 |
| Acrylic Latex (50 wt % solid content) | 394 |
| TEXANOL ® (coalescent, commercially available from Eastman Chemical Company) | 10 |
| ARCHER RC ™ (coalescent aid, commercially available from Archer Daniels Midland Company) | 6 |
| ACRYSOL ® RM-2020 NPR (rheology additive, commercially available from Rohm and Haas Company) | 10 |
| ACRYSOL ® RM-825 (rheology additive, commercially available from Rohm and Haas Company) | 2 |
| BYK-019 ® (defoamer, commercially available from BYK-Chemie) | 2 |
| Water | 7 |
| Total Weight | 906 |

*BM 229 Y1 is a color pigment concentrate using organic pigment PY 74.

In Example 2, no inorganic color pigment is used and the organic color pigments represent 11.7 vol % of the foundation paint and 30.8 vol % of the dried foundation film.

The C/R on a 3-mil drawdown was measured for one coat of color foundation Example 2, and for one coat of Example 2 plus a top coat of Example 1. As shown in FIG. 1, the C/R of the two-coat paint system matches the C/R of four coats of conventional paint. The C/Rs from Example 2 are reported in Table 2, below.

Example 3

Color Foundation Finish, Formulated Using Tico Yellow 594 Color Pigment (Heubach)

A color foundation finish (100 gallons) was prepared using the following quantities of grind and letdown ingredients:

| | Quantity (pounds) |
|---|---|
| Grind Ingredient | |
| Water | 107.1 |
| CARBOWAX ™ PEG 400 (polyethylene glycol, commercially available from Dow Chemical Company) | 36.0 |
| Acrylic Alkali Soluble Emulsion (30 wt %) | 4.6 |
| NUOSEPT ® 95 (preservative, commercially available from International Specialty Products) | 1.3 |
| Aqueous Ammonia (39.4 wt %) | 0.77 |
| BYK-156 ® (wetting/dispersing additive, commercially available from BYK-Chemie) | 15.4 |
| DISPERBYK-190 ® (deflocculating wetting and dispersing additive, commercially available from BYK-Chemie) | 11.8 |
| KELECIN ® 1081 (dispersant, commercially available from Reichold, Inc.) | 3.1 |
| DEXTROL OC ® 180 (anionic surfactant, commercially available from Dexter Chemical) | 6.2 |
| TICO ® Y594 (organic/inorganic hybrid yellow pigment, commercially available from Heubach) | 401 |
| SURFYNOL ® MD-20 (defoamer, commercially available from Air Products and Chemicals, Inc.) | 1 |
| Letdown Ingredient | |
| Water | 65.9 |
| Acrylic Alkali Soluble Emulsion (30 wt %) | 2.1 |
| Aqueous Ammonia (39.4 wt %) | 1.3 |
| SURFYNOL ® MD-20 (defoamer, commercially available from Air Products and Chemicals, Inc.) | 1.3 |
| POLYPHASE ® 678 (preservative, commercially available from Troy Corporation) | 0.5 |
| Water | 10.8 |
| Propylene Glycol | 9.9 |
| TEXANOL ® (coalescent, commercially available from Eastman Chemical Company) | 16.5 |
| Acrylic Latex (50 wt %) | 386.7 |
| ACRYSOL ® RM-2020 NPR (rheology additive, commercially available from Rohm and Haas Company) | 9.9 |
| BYK-019 ® (defoamer, commercially available from BYK-Chemie) | 4.1 |
| Water | 7.1 |
| Total Weight | 1105 |

In Example 3, no inorganic color pigment is used. The organic color pigments represent 19.3% by volume of the foundation paint and 42.5% of the dried film. The C/R of the foundation coat on a 3-mil drawdown is 99%.

Example 4

Color Foundation Finish, Formulated Using Organic Yellow Pigment (PY 74) and Titanium Dioxide A yellow pigment paste was prepared using the following ingredients:

| Ingredient | Quantity (pounds) |
|---|---|
| Water | 82.861 |
| CARBOWAX ™ PEG 400 (polyethylene glycol, commercially available from Dow Chemical Company) | 14 |
| NUOSEPT ® 95 (preservative, commercially available from commercially available from International Specialty Products) | 1.05 |
| DREWPLUS ® L-475 (defoamer, commercially available from Ashland, Inc.) | 1.54 |
| BYK-156 ® (wetting/dispersing additives, commercially available from BYK-Chemie) | 10.325 |
| SOLSPERSE ® 27000 (dispersant, commercially available from Noveon) | 2.45 |
| TEGO ® DISPERS 750W (dispersant, commercially available from Tego Chemie Service) | 7.893 |
| TRITON ® X-100 (nonionic surfactant, commercially available from Rohm and Haas Company) | 7.847 |
| YT-818-D DAL M.A. (Organic Yellow Pigment PY74) | 210 |
| Ingredients above were ground through a sand-mill and then under agitation, the ingredients below were added. | |
| DREWPLUS ® L-475 (defoamer, commercially available from Ashland, Inc.) | 2.09 |
| POLYPHASE ® 678 (preservative, commercially available from Troy Corporation) | 0.23 |
| Water | 16.021 |
| Total weight of yellow pigment paste | 356.7 |

In a separate container, a color foundation finish (100 gallons) was prepared using the following quantities of grind and letdown ingredients:

| | Quantity (pounds) |
|---|---|
| Grind Ingredient | |
| Water | 87.664 |
| Propylene Glycol | 8.357 |
| NUOSEPT ® 95 (preservative, commercially available from International Specialty Products) | 0.65 |
| TAMOL ® 681 (dispersant, commercially available from Rohm and Haas Company) | 12.071 |
| TRONOX ® CR-826 (titanium dioxide, commercially available from Kerr-McGee) | 240 |
| OPTIWHITE MX ® (kaolin extender pigment, commercially available from Burgess Pigment Co.) | 23.214 |
| VICRON ® 45-3 FG (calcium carbonate, commercially available from Omya Inc.) | 37.143 |
| DIAFIL ® 525 (amorphous silica, commercially available from Celite Corporation) | 27.857 |
| SYLOID ® W 900 (amorphous silica, commercially available from W.R. Grace & Co.) | 23.214 |
| Aqueous Ammonia (39.4 wt %) | 0.097 |
| ATTAGEL ® 50 (thickener, commercially available from Engelhard Corporation) | 2.786 |
| DREWPLUS ® L-475 (defoamer, commercially available from Ashland, Inc.) | 0.577 |
| Letdown Ingredient | |
| Acrylic Latex (50 wt %) | 270 |
| Styrene Acrylic Latex (45 wt %) | 27 |
| TRITON ® GR-5M (surfactant, commercially available from Rohm and Haas Company) | 1.393 |
| Aqueous Ammonia (39.4 wt %) | 0.065 |
| TEXANOL ® (coalescent, commercially available from Eastman Chemical Company) | 4.643 |
| ARCHER RC ™ (coalescent aid available form Archer Daniels Midland Company) | 9.286 |
| Yellow Pigment Paste from Above | 356.7 |
| ACRYSOL ® RM-5000 (rheology additive, commercially available from Rohm and Haas Company) | 8.124 |
| ACRYSOL ® RM-825 (rheology additive, commercially available from Rohm and Haas Company) | 2.145 |
| DREWPLUS ® L-475 (defoamer, commercially available from Ashland, Inc.) | 0.487 |
| POLYPHASE ® 678 (preservative, commercially available from Troy Corporation) | 0.975 |
| Water | 1.703 |
| Propylene Glycol | 4 |
| Total Weight | 1154.35 |

In Example 4, the organic to inorganic color pigment ratio is 2.49 by volume. The organic color pigments represent 17.9% by volume of the foundation paint and 35.0% of the dried film. The C/R of a 3-mil drawdown of Example 4 is 99.2%.

Conventional color primers using titanium dioxide have a "whitening effect" because only a small amount of color pigments, especially organic color pigments, are used in the tints. The color foundation in Example 4 uses a large amount of organic color pigments that overcome the whitening effect from titanium dioxide. It is a tintable yellow foundation finish that can be tinted to many different shades required by top coats. Table 1 shows this yellow foundation finish of Example 4 (124 oz.) tinted with various BM Details Colorants (4 oz.).

TABLE 1

CONTRAST RATIOS OF YELLOW FOUNDATION FINISH (EXAMPLE 4) TINTED WITH BM DETAILS COLORANTS (FOUNDATION FINISH: 124 OZ., COLORANT: 4 OZ.)

| BM Details Colorant | C/R(%) |
|---|---|
| BM Details Red Oxide 229 R3 | 99.3 |
| BM Details Yellow 229Y1 | 99.1 |
| BM Details Red 229R2 | 99.4 |
| BM Details Red Toner 229R1 | 99.5 |
| BM Details Blue 229B1 | 99.6 |
| BM Details Gray 229S2 | 99.9 |
| BM Details Oxide Yellow 229Y3 | 99.7 |
| BM Details Green 229G1 | 99.5 |
| BM Details Magenta 229M1 | 100 |

The color foundation coat uses a significantly larger amount of organic pigments than those in a conventional first coat and at least twice as many organic pigments by volume than the top coat. Table 2 lists the organic pigment levels in the conventional first coat, color foundation coat, and top coat.

TABLE 2

ORGANIC PIGMENT CONTENT AND CONTRAST RATIOS OF EXAMPLES 1-4

| Example | C/R of First Coat | C/R of First + Second Coat* | Organic color Pigment Vol. % (First Coat) | Organic color Pigment/Binder Vol. Ratio (First Coat) | Organic color Pigment Vol. % (Top coat) | Organic color Pigment (Vol % of Color Pigments in Top Coat) | Organic color Pigment/ Binder Vol. Ratio (Top coat) | Organic Color Pigment Ratio in First/ Second Coat (vol) | Organic/ Inorganic Color Pigment Ratio in Foundation Coat |
|---|---|---|---|---|---|---|---|---|---|
| Example 1 | 72 | 87 | 6.75% | 0.094 | 6.75 | 100 | 0.094 | 1 | Infinity |
| Example 2 | 95 | 96 | 30.8% | 0.444 | 6.75 | 100 | 0.094 | 4.6 | Infinity |
| Example 3 | 99 | 99.2 | 42.5% | 0.74 | 6.75 | 100 | 0.094 | 6.3 | Infinity |
| Example 4 | 99.2 | 99.3 | 35.0% | 0.87 | 6.75 | 100 | 0.094 | 5.2 | 2.49 |

*Note: Examples 1-4 used Example 1 as the Second coat (top coat).

Example 5

Two Benjamin Moore Color Finishes, Formulated from a Yellow Foundation Coat and Top Coat Color foundation coat/top coat paint systems (with the colors of Yellow (BM color palette 2023-10) and Bright Lime (BM color palette 2025-10)) were compared with conventional approaches using two top coats of BM Details, C2 commercial color primer with a top coat, and BM Deep Base Primer (216) with Benjamin Moore Regal top coat (319). The paints using conventional approaches were obtained from Benjamin Moore and C2 retail stores.

Example 5A

A Color Foundation Coat and a Top Coat for Yellow 2023-10

The following components were used in the first and second coats of Example 5A:

| | Quantity (oz.) |
|---|---|
| **First Coat Component** | |
| Color Foundation Coat from Example 4 | 115 |
| BM Details Colorant 229 S1(Black) | $\frac{1}{8}$ |
| BM Details Colorant 229S2(Gray) | $\frac{1}{3}$ |
| BM Details Colorant 229Y2 (Yellow) | $7\frac{1}{2}$ |
| **Second Coat (Top Coat) Component** | |
| BM Details Eggshell 5244X | 115 |
| BM Details Colorant 229 S1(Black) | $\frac{1}{32}$ |
| BM Details Colorant 229W1(White) | $\frac{19}{32}$ |
| BM Details Colorant 229Y2(Yellow) | $14\frac{3}{32}$ |
| BM Details Colorant 229S2(Gray) | $\frac{1}{32}$ |

Example 5B

A Color Foundation Coat and a Top Coat for Bright Lime 2025-10

The following components were used in the first and second coats of Example 5B:

| | Quantity (oz.) |
|---|---|
| **First Coat Component** | |
| Color Foundation Coat from Example 4 | 115 |
| BM Details Colorant 229 G1(Green) | $2\frac{1}{4}$ |
| BM Details Colorant 229Y2 (Yellow) | 5 |
| **Second Coat (Top Coat) Component** | |
| BM Details Eggshell 5244X | 115 |
| BM Details Colorant 229Y2(Yellow) | $13\frac{15}{16}$ |
| BM Details Colorant 229Y3 (Oxide Yellow) | $\frac{1}{16}$ |

-continued

| | Quantity (oz.) |
|---|---|
| BM Details Colorant 229 G1(Green) | 7.5⁄32 |
| BM Details Colorant 229W1(White) | ¾ |

Example 5C

A Color Primer and a Top Coat, from C2 Paint, for Bright LIME 2025-10

For Example 5C, the first coat contained a Color Primer Accent Color System (C2085) tinted to BM Color 2025-10 at a C2 retail store (see www.C2color.com). The second coat (top coat) contained a C2 Interior Eggshell Acrylic Enamel (C4285) tinted to BM Color 2025-10 at a C2 retail store.

Example 5D

Benjamin Moore Regal Deep Base Primer 216 and Eggshell 319 for Bright Lime 2025-10

For Example 5D, the first coat contained a BM Regal Deep Base Primer 216 tinted to color P702 in BM Color palette as a recommended primer. The second coat (top coat) contained BM Regal 319 4B tinted to BM Color 2025-10.

| | Quantity (oz.) |
|---|---|
| First Coat Component | |
| BM Deep Base Primer 21604 | 116 |
| BM Color Preview Colorant 22307 Yellow | 5⅝ |
| BM Color Preview Colorant 23302 Green | 5⅝ |
| Second Coat (Top Coat) Component | |
| BM Regal Eggshell 31904 | 116 |
| BM Color Preview Colorant 22307 Yellow | 13½ |
| BM Color Preview Colorant 23302 Green | 5⁄16 |

In Example 5D, the organic color pigment volume for the first coat is 1.6% in paint and 6.16% in dried film. The organic color pigment volume for the second coat is 2.17% in paint and 5.70% in dried film.

Example 5E

For Example 5E, two coats of BM Details Eggshell were tinted to BM Color 2023-10 as in the second coat of Example 5A. In example 5E, the organic color pigment volume is 1.78% in paint and 4.23% in dried film.

Example 5F

For Example 5F, two coats of BM Details Eggshell were tinted to BM Color 2025-10 as in the second coat of Example 5B. In Example 5F, the organic color pigment volume is 1.77% in paint and 4.21% in dried film.

TABLE 3

CONTRAST RATIOS OF FOUNDATION COATS/TOP COATS OF EXAMPLES 5A-5F

| Paint | C/R of First Coat (%) | C/R of Second Coat (%) |
|---|---|---|
| Example 5A: Color Foundation Coat/Top Coat for Color 2023-10 | 100 | 100 |
| Example 5B: Color Foundation/Top Coat for Color 2025-10 | 100 | 100 |
| Example 5C: C2 Primer/Top Coat for Color 2025-10 | 92.2 | 98.7 |
| Example 5D: BM Regal Deep Base Primer 216/Eggshell 319 for Color 2025-10 | 99.3 | 100 |
| Example 5E: Two coats of BM Details Eggshell 524 for Color 2023-10 | 76.2 | 93.1 |
| Example 5F: Two coats of BM Details Eggshell 524 for Color 2025-10 | 83 | 97.0 |

A contrast ratio of at least 99%, or preferably 99.5%, for two or more coats of certain bright and high chroma colors, is required to have hiding power on black/white substrate without being detected by trained eyes. Examples of these bright and high chorma colors are organic yellow and other light colors tinted from organic yellow, such as light orange and light blue.

Conventional approaches, such as Examples 5E and 5F, would need more than two 3-mil thick coats to have the required hiding power on black/white substrate of Form 18B. Two-coat paints of a conventional primer and a top coat, such as Example 5C in which the primer basically has about the same organic pigment content as in the top coat, also would not have adequate hiding power on black/white substrate.

Other conventional approaches include adding high hiding power color pigments (e.g., dark green, blue, black or some other dark color pigments in the primer as the first coat. For example, a better hiding organic pigment, such as green is used in Example 5D to improve hiding. Although the C/R is sufficient to hide black/white substrate, the difference between the color of primer and top coat is increased. Consequently, one top coat is not sufficient to hide the color of the underlying primer so as to obtain the desired color. FIGS. 2-5 illustrate the deficiency of this approach as well as the advantages of using a color foundation coat and a top of coat of the invention.

FIGS. 2 and 3 are spectral reflectance curves of color foundation/top coat paint systems of the present invention versus two same-colored top coats over the wavelength of visible light for Examples 5A and 5E, and Examples 5B and 5F, respectively. Spectral reflectance curves are reflectance energies measured by spectrophotometers at predetermined intervals of wavelengths, e.g., 10 nanometers, in the visible radiation spectrum, i.e., 400-700 nanometers. The differences in the curves of color samples indicate how well the color samples will match under different light sources. The tintable color foundation coats are tinted to match the top coat to such a degree that after applying the top coat, the color difference between the color foundation coat/top coat paint systems and two same-colored top coats is less than 0.6 Delta E. The value of Delta E was calculated using the CIE2000 DE color difference formula (set out in G. Sharma, W. Wu, and E. Dalal, "The CIEDE2000 Color-Difference Formula: Implementation Notes, Supplementary Test Data, and Mathematical Observations," *Color Res. Appl.* 30: pp. 21-30, February 2005, which is incorporated herein by reference).

For Color 2023-10, the Delta E value between the color foundation/top coat paint system (from Example 5A) and two same-colored top coats (from Example 5E) is 0.12 as shown in FIG. 2. For Color 2025, the Delta E value between the color foundation/top coat paint system (from Example 5B) and two same-colored top coats (from Example 5F) is 0.49 as shown in FIG. 3. This shows that the inventive foundation/top coats of Examples 5A and 5B provide substantially the same color as two top coats of Examples 5E and 5F, respectively.

In order to achieve such a close match, the reflectance curve of the color foundation coat and the reflectance curve of the foundation and top coat should have a similar pattern. FIG. 4 shows the reflectance curves of the color foundation coat and foundation and top coat of Example 5B. The Delta E between the two curves is 3.66, mostly in the 400 nm-500 nm range.

FIG. 5 shows the reflectance curves of the first coat and top coat of Example 5D, which uses a BM Regal Deep Base Primer and a BM Regal top coat. Example 5D had shown a high C/R as reported above in Table 3. However, because of the large difference in the colors of first and top coats, the color of the first coat can be seen through the top coat, as shown in their reflectance curves, thus interfering in the color of the top coat. The Delta E value between the first coat of Example 5D and the combination of the first and second coats is 25.81.

The color of this primer/top coat paint system in Example 5D also significantly deviates from the color of top coat as shown in FIG. 6. The Delta E value between the primer/top coat paint system of Example 5D and the same two top coats is 3.35. However, the two curves show significant deviation throughout the visible range, i.e., 480 nm-700 nm. Two colors with a Delta E value less than 0.6 is considered to be indistinguishable by human eyes.

When paint films are applied using brushes or rollers, the paint films are not as smooth as in drawdowns. Brush marks from brushes or bumps form rollers may be formed. The color of the primer, which has a very different color than the top coat, may not only be seen through the top coat but also may have a non-uniform appearance. Additional one or more top coats are required to have the right and uniform color.

Example 6

Conventional Color Finish, Formulated Using Organic Red Pigment

A conventional color finish was formulated using the following ingredients:

| Ingredient | Quantity (oz.) |
|---|---|
| Benjamin Moore Details 5244X | 115 |
| Benjamin Moore Details Organic Red Color Concentrate 229 R2 | 15 |

Example 7

Tintable Red Color Foundation, Formulated Using Organic Red Color Pigment

A tintable red color foundation, which contains both inorganic pigment ($TiO_2$) and red organic pigment, was prepared using the following quantities of grind and letdown ingredients:

| | Quantity (pounds) |
|---|---|
| Grind Ingredient | |
| Water | 111.87 |
| Propylene Glycol | 3.516 |
| NUOSEPT ® 95 (preservative, commercially available from International Specialty Products) | 0.74 |
| TAMOL ® 681 (dispersant commercially available from Rohm and Haas Company) | 4.994 |
| TRONOX ® CR-826 (titanium dioxide, commercially available from Keer-McGee) | 133.17 |
| OPTIWHITE MX ® (kaolin extender pigment, commercially available from Burgess Pigment Co.) | 44.39 |
| VICRON ® 25-11 (calcium carbonate, commercially available from Omya Inc.) | 96.178 |
| VICRON ® 31-6 (calcium carbonate, commercially available from Omya Inc.) | 44.39 |
| SYLOID ® W 900 (amorphous silica, commercially available from W.R. Grace & Co.) | 22.195 |
| Aqueous Ammonia (39.4 wt %) | 0.553 |
| Letdown Ingredient | |
| DREWPLUS ® L-475 (defoamer, commercially available from Ashland, Inc.) | 0.656 |
| TRITON ® X-100 (nonionic surfactant, commercially available from Rohm and Haas Company) | 3.292 |
| TRITON ® GR-5M (surfactant, commercially available from Rohm and Haas Company) | 0.792 |
| Aqueous Ammonia (39.4 wt %) | 0.664 |
| TEXANOL ® (coalescent, commercially available from Eastman Chemical Company) | 5 |
| Acrylic Latex (50 wt %) | 280 |
| Styrene Acrylic Latex (45 wt %) | 30 |
| ARCHER RC ™ (coalescent aid, commercially available from Archer Daniels Midland Company) | 10 |
| Benjamin Moore Details Organic Red Concentrate 229R2 | 256.14 |
| ACRYSOL ® RM-5000 (rheology additive, commercially available from Rohm and Haas Company) | 11.541 |
| ACRYSOL ® RM-825 (rheology additive, commercially available form Rohm and Haas Company) | 2.589 |
| DREWPLUS ® L-475 (defoamer, commercially available from Ashland, Inc.) | 5.541 |
| POLYPHASE ® 678 (preservative, commercially available from Troy Corporation) | 1.11 |
| Water | 33.386 |
| Propylene Glycol | 5.327 |

The contrast ratios (C/Rs) of Examples 6 and 7, measured on a Leneta card, are listed in Table 4. Two coats of conventional Example 6 have a C/R of 93% and will not have sufficient hiding power to hide black/white substrate. The red foundation of Example 7 with a top coat improves the C/R to 99.8%.

TABLE 4

ORGANIC PIGMENT CONTENT AND CONTRAST RATIOS OF EXAMPLES 6 AND 7

| Example | C/R of First Coat (%) | C/R of Two Coats (%) | Organic color Pigment Vol. % (First coat) | Organic Pigment/Binder Vol. Ratio (First coat) | Organic Pigment (Vol % of Color Pigments in Top Coat) | Organic Color Pigment Volume Ratio in First/Second Coat (vol) | Organic/ Inorganic Color Pigment Volume Ratio in Foundation Coat |
|---|---|---|---|---|---|---|---|
| Example 6 | 82.7 | 93 | 4.4 | 0.06 | 100 | 1 | Infinity |
| Example 7* | 98.7 | 99.8 | 10.4 | 0.197 | 100 | 2.4 | 1 |

*Example 6 used as the top coat.

Example 7 is a tintable red foundation finish that can be tinted with color concentrates to obtain desired colors. In Table 5, Example 7 (124 oz.) was tinted with various Benjamin Moore Details Color Concentrates (4 oz.). The C/Rs were measured on a 3-mil draw-down.

TABLE 5

COLOR (RED) FOUNDATION FINISH TINTED WITH COLOR CONCENTRATES

| Colorant | C/R % |
|---|---|
| BM Details Yellow 229Y1 | 99.1 |
| BM Details Red Toner 229R1 | 99.1 |
| BM Details Blue 229B1 | 99.9 |
| BM Details Oxide Yellow 229Y3 | 99.7 |
| BM Details Green 229G1 | 99.7 |
| BM Details Magenta 229M1 | 99.2 |
| BM Details Black 229S1 | 99.7 |

Example 8

C/R of Red Foundation Finish Vs. C2 Paints and BM Regal for Color 2000-10

Example 8A

C2 Primer (C2085) and C2 Interior Acrylic Eggshell Enamel (C4284) were obtained from a C2 retail store and tinted to the Color 2000-10 in Benjamin Moore Color Palette.

Example 8B

A Deep Base Primer 216 tinted to the Color P-500 in BM Color Palette was used as the first coat. Benjamin Moore Regal Eggshell was tinted to 2000-10 was used as the second coat. The following components were used in the first and second coats of Example 8B:

| | Quantity (oz.) |
|---|---|
| First Coat Component | |
| Benjamin Moore Regal Deep Base Primer 21604 | 116 |
| Benjamin Moore Color Preview Colorant Organic Red, 23305 | 11.4 |
| Second Coat (Top Coat) Component | |
| Benjamin Moore Regal Eggshell 319 - 4B | 116 |
| Benjamin Moore Color Preview Colorant Organic Red 23305 | 13.75 |

Example 8C

For example 8C, the red color foundation of Example 7 was used as a first coat. Benjamin Moore Details Eggshell 524 was tinted to 2000-10 and was used as second coat. The following components were used in the first and second coats of Example 8C:

| | Quantity (oz.) |
|---|---|
| First Coat Component | |
| Color Foundation Coat from Example 7 | 115 |
| Second Coat (Top Coat) Component | |
| BM Details Eggshell 5244X | 115 |
| BM Details Colorant 229W1(White) | 0.75 |
| BM Details Colorant 229Y2(Organic Yellow) | 6.44 |
| BM Details Colorant 229S2 (Grey) | 0.69 |
| BM Details Colorant 229R2(Organic Red) | 7 |

The C/Rs were measured on dried drawdowns using a 3-mil drawdown bar, and are listed in Table 6. The color foundation/top coat was the only paint system that provided adequate hiding for two coats. C2 paints with three coats still did not provide sufficient hiding power.

The color difference between the red foundation coat/top coat (Example 8C) and the same two top coats has a Delta E of 0.26. This small Delta E is reflected in the reflectance curves in FIG. 7 which shows almost identical curves for the two systems.

TABLE 6

| CONTRAST RATIOS OF EXAMPLES 8A-8C | | | | | | |
|---|---|---|---|---|---|---|
| | Example 8A: C2 Paints | C/R (%) | Example 8B: BM Regal | C/R (%) | Example 8C: Color Foundation from Example 7 | C/R (%) |
| First coat | C2 Primer C2085 | 57.7 | Deep Base Primer 216 | 91.9 | Color Red Foundation | 98.7 |
| Second coat | C2 Top Coat C4284 | 78.8 | Regal Eggshell 319 | 91.9 | BM Details Eggshell 524 | 99.1 |
| Third Coat | C2 Top Coat C4284 | 89.7 | N/A | N/A | N/A | N/A |

Example 9

Measurement of Color Space Parameter C*

C* is the distance of a color in the color space to the center. It is a measure of the chroma of a color. A large value of C* indicates a high chroma color, or a clean color as referred to in the paint industry. Organic pigments typically provide higher chromatic colors than inorganic pigments of the same colors. Organic yellow and red pigmented paints may have C* of at least 70 and well over 100, depending on the amount and type of other color or extender pigments in paints.

C* of color foundation/top coat systems and multiple top coats were measured with a spectrophotometer on dried films. As shown in Table 7, the C* of a color foundation/top coat system is almost identical to that of multiple top coats of same colors. The color foundation/top coat system retains the high chroma of those colors from organic color pigments. In addition, the L is the indication of the brightness of a color. Table 7 shows that the brightness of the color is not decreased by the foundation coat.

TABLE 7

| COMPARISON OF L*, C* AND H* OF COLOR FOUNDATION/TOP COAT WITH MULTIPLE TOP COATS | | | | |
|---|---|---|---|---|
| Color | Paint | Brightness (L*) | Chroma (C*) | Hue (H*) |
| 2000-10 | Red Foundation Coat/BM Details 524 top coat (Ex. 8C) | 42.89 | 77.57 | 35.16 |
| | Two coats of BM Details 524 | 43.01 | 77.82 | 35.25 |
| 2023-10 | Tinted Yellow Foundation/BM Details 524 top coat (Ex. 5A) | 81.39 | 92.49 | 87.83 |
| | Two coats of BM Details 524 (Ex. 5E) | 81.47 | 92.85 | 87.74 |
| 2025-10 | Tinted Yellow Foundation/BM Details 524 top coat (Ex 5B) | 76.74 | 84.67 | 100.62 |
| | Two coats of BM Details 524 (Ex. 5F) | 76.06 | 84.52 | 100.57 |

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A paint system comprising:

a foundation base component comprising an aqueous latex emulsion and at least one organic pigment present in an amount sufficient to comprise at least about 8% by volume when thy; and an opaque top coat component applied over the foundation base component, the top coat component comprising color pigments, wherein primarily all color pigments in the top coat component are organic color pigments, wherein the ratio of the volume percentage of organic color pigments in the foundation base component to the volume percentage of organic color pigments in the top coat component is at least about 2, and wherein at least one of the foundation base component or top coat component comprises an inorganic pigment.

2. The paint system of claim 1, wherein at least one organic pigment is present in an amount sufficient to comprise at least about 15% by volume when dry.

3. The paint system of claim 1, wherein at least one organic pigment is present in an amount sufficient to comprise at least about 30% by volume when dry.

4. The paint system of claim 1, wherein the ratio of the volume percentage of organic color pigments in the foundation base component to the volume percentage of organic color pigments in the top coat component is at least about 2.5.

5. The paint system of claim 1, wherein the ratio of the volume percentage of organic color pigments in the foundation base component to the volume percentage of organic color pigments in the top coat component is at least about 3.0.

6. The paint system of claim 1, wherein at least about 80% by volume of all color pigments in the top coat component comprise organic color pigments.

7. The paint system of claim 1, wherein at least about 85% by volume of all color pigments in the top coat component comprise organic color pigments.

8. The paint system of claim 1, wherein at least about 90% by volume of all color pigments in the top coat component comprise organic color pigments.

9. The paint system of claim 1, wherein the foundation base component and the top coat component comprise substantially the same color.

10. The paint system of claim 1, wherein the foundation base component further comprises inorganic color pigments.

11. The paint system of claim 10, wherein the ratio of organic color pigments to inorganic color pigments in the foundation base component is at least about 0.5.

12. The paint system of claim 11, wherein the ratio of organic color pigments to inorganic color pigments in the foundation base component is at least about 1.0.

13. The paint system of claim 11, wherein the ratio of organic color pigments to inorganic color pigments in the foundation base component is at least about 1.5.

14. The paint system of claim 1, wherein the foundation base component further comprises a plurality of organic color pigments.

15. A paint system comprising:

a foundation base component comprising an aqueous latex emulsion and at least one organic color pigment; and an opaque top coat component applied over the foundation base component, the top coat component comprising at least one organic color pigment, wherein at least about 80% by volume of all color pigments in the top coat component comprise organic color pigments;

wherein the ratio of the volume percentage of organic color pigments in the foundation base component to the volume percentage of organic color pigments in the top coat component is at least about 2, and wherein at least one of the foundation base component or top coat component comprises an inorganic pigment.

16. The paint system of claim 15, wherein the ratio of the volume percentage of organic color pigments in the foundation base component to the volume percentage of organic color pigments in the top coat component is at least about 2.5.

17. The paint system of claim 15, wherein the ratio of the volume percentage of organic color pigments in the foundation base component to the volume percentage of organic color pigments in the top coat component is at least about 3.0.

18. The paint system of claim 15, wherein the foundation base component and the top coat component comprise substantially the same color.

19. The paint system of claim 15, wherein the foundation base component further comprises inorganic color pigments.

20. The paint system of claim 19, wherein the ratio of organic color pigments to inorganic color pigments in the foundation base component is at least about 0.5.

21. The paint system of claim 19, wherein the ratio of organic color pigments to inorganic color pigments in the foundation base component is at least about 1.0.

22. The paint system of claim 19, wherein the ratio of organic color pigments to inorganic color pigments in the foundation base component is at least about 1.5.

23. The paint system of claim 15, wherein the foundation base component further comprises a plurality of organic color pigments.

24. A paint system comprising:

a foundation base component comprising an aqueous latex emulsion and at least one organic pigment present in an amount sufficient to comprise at least about 8% by volume when thy; and an opaque top coat component applied over the foundation base component, the top coat component comprising organic color pigments wherein at least about 80% by volume of all color pigments in the top coat component comprise organic color pigments;

wherein the ratio of the volume percentage of organic color pigments in the foundation base component to the volume percentage of organic color pigments in the top coat component is at least about 2, and wherein at least one of the foundation base component or top coat component comprises an inorganic pigment.

25. The paint system of claim 24, wherein at least one organic pigment is present in an amount sufficient to comprise at least about 15% by volume when dry.

26. The paint system of claim 24, wherein at least one organic pigment is present in an amount sufficient to comprise at least about 30% by volume when dry.

27. The paint system of claim 24, wherein the foundation base component and the top coat component comprise substantially the same color.

28. The paint system of claim 24, wherein the foundation base component further comprises inorganic color pigments.

29. The paint system of claim 28, wherein the ratio of organic color pigments to inorganic color pigments in the foundation base component is at least about 0.5.

30. The paint system of claim 29, wherein the foundation base component further comprises a plurality of organic color pigments.

31. The paint system of claim 24, wherein the ratio of the volume percentage of organic color pigments in the foundation base component to the volume percentage of organic color pigments in the top coat component is at least about 2.5.

32. The paint system of claim 24, wherein the ratio of the volume percentage of organic color pigments in the foundation base component to the volume percentage of organic color pigments in the top coat component is at least about 3.0.

33. A paint system consisting essentially of:

a foundation base component comprising an aqueous latex emulsion and at least one organic pigment present in an amount sufficient to comprise at least about 8% by volume when dry; and an opaque top coat component applied over the foundation base component, the top coat component comprising organic color pigments wherein at least about 80% by volume of all color pigments in the top coat component comprise organic color pigments;

wherein the ratio of the volume percentage of organic color pigments in the foundation base component to the volume percentage of organic color pigments in the top coat component is at least about 2, and wherein at least one of the foundation base component or top coat component comprises an inorganic pigment.

* * * * *